March 20, 1956  C. GRANET ET AL  2,738,970
OSCILLATION DAMPER
Filed April 4, 1951  4 Sheets-Sheet 1
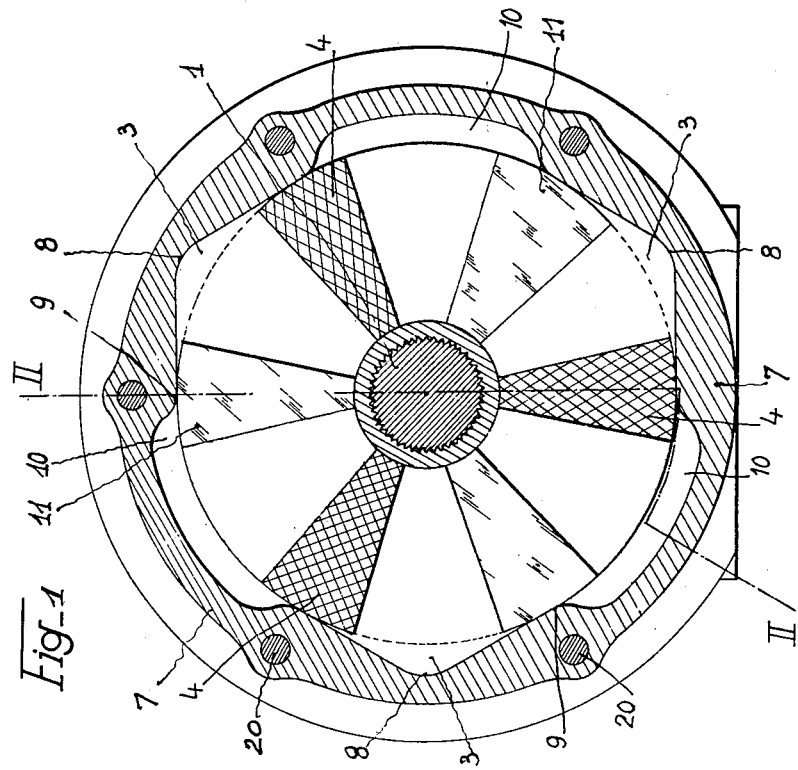
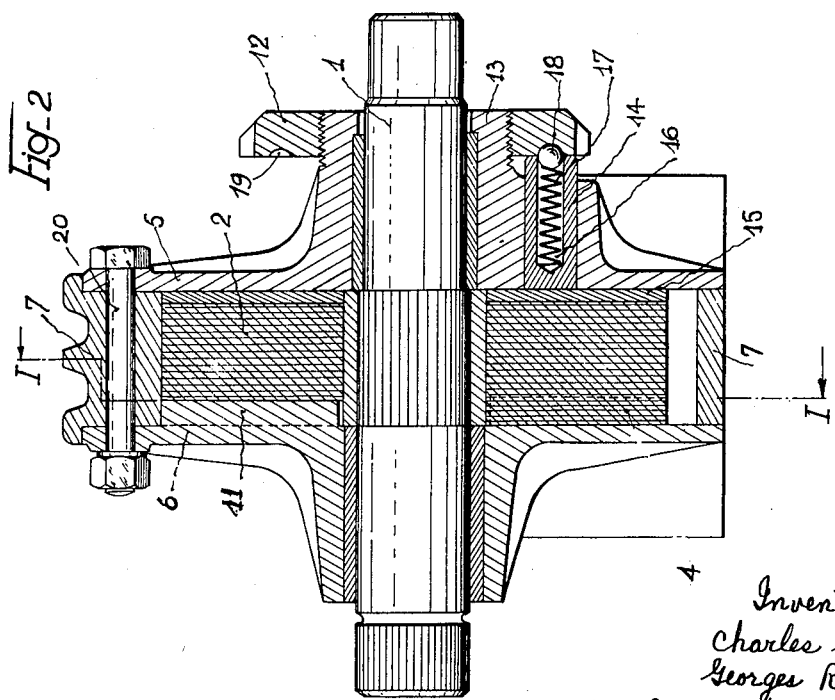
Inventors:
Charles Granet and
Georges Roland
By: Michael S. Striker
att March 20, 1956 C. GRANET ET AL 2,738,970
OSCILLATION DAMPER
Filed April 4, 1951 4 Sheets-Sheet 2

Inventors:
Charles Granet and
Georges Roland
By: Michael S. Striker
Agt

March 20, 1956   C. GRANET ET AL   2,738,970
OSCILLATION DAMPER
Filed April 4, 1951   4 Sheets-Sheet 3
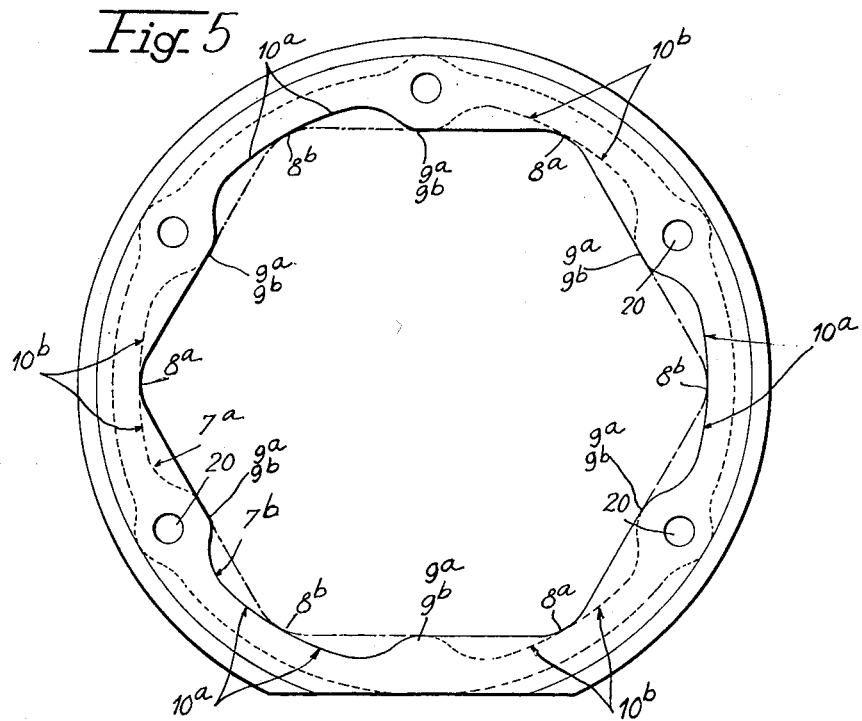
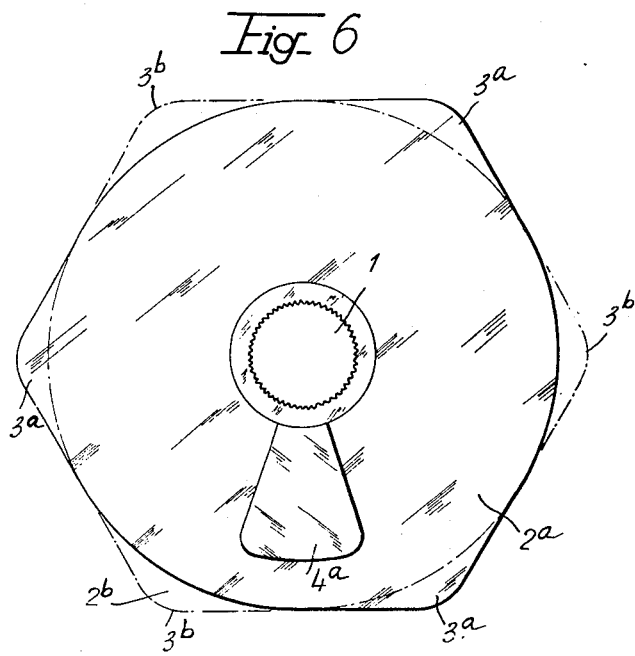
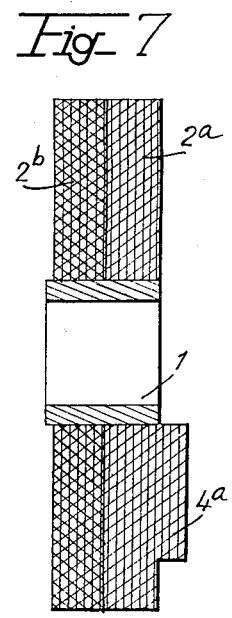
Inventors:
Charles Granet and
Georges Roland
By: Michael S. Striker
Att March 20, 1956 C. GRANET ET AL 2,738,970
OSCILLATION DAMPER
Filed April 4, 1951 4 Sheets-Sheet 4
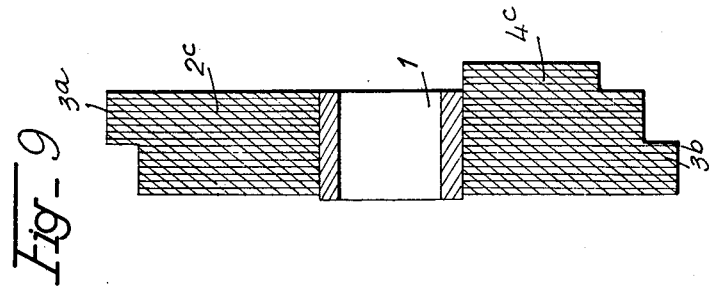
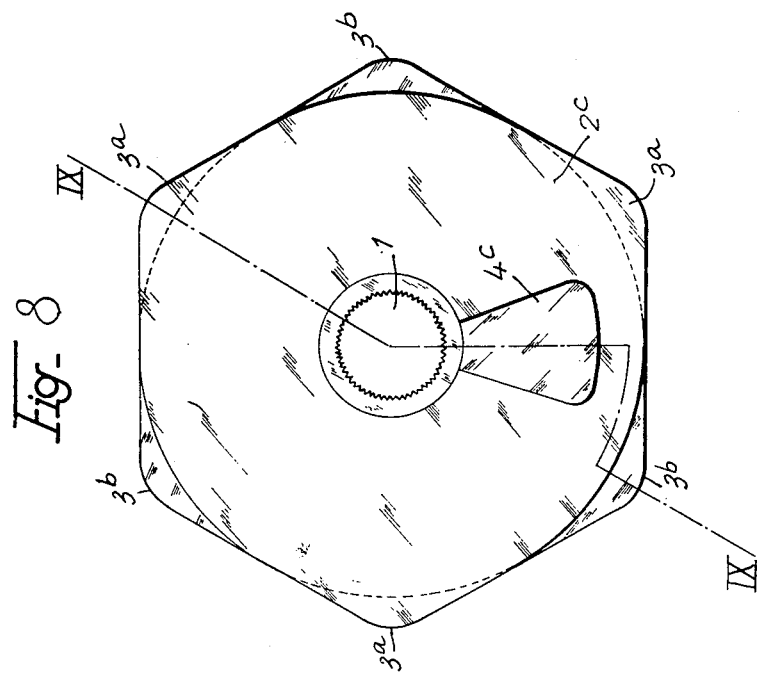
Inventors:
Charles Granet and
Georges Roland
By: Michael S. Striker
agt

United States Patent Office 2,738,970
Patented Mar. 20, 1956

2,738,970
OSCILLATION DAMPER

Charles Granet and Georges Roland, Courbevoie, France

Application April 4, 1951, Serial No. 219,169

Claims priority, application France April 6, 1950

6 Claims. (Cl. 267—9)

The object of the present invention is to provide a friction type oscillation damper and particularly one comprising a fixed hollow member hereafter called "stator" and a movable member or "rotor" capable of rotary movement with respect to the "stator" under the influence of displacements of the vehicle portions, the oscillations of which are desired to be damped.

In the damper according to the invention friction takes place directly or indirectly between the "rotor" and the "stator."

One of the objects of the invention is to provide a design of an adjustable damper capable of oscillating progressively in either direction of rotation of the "rotor" with respect to the "stator," said damper absorbing perfectly the shocks transmitted to the springs, and also capable of flattening very quickly the representative curve of the vehicle oscillations.

Another object of the invention is to provide a design of an adjustable damper with adjustment means capable of providing the desired initial friction coefficient between rotor and stator, said damper moderating progressively the effect of the first oscillation felt by the spring and opposing itself to the abrupt relaxation of the rotor with respect to the stator after this first oscillation. In particular, the damper according to the invention is intended to provide a slow progressive braking of the rotor with respect to the stator during the first part of their relative displacement, up to a maximum intensity, after which the braking becomes rapidly zero after having attained its maximum value, whereas in the reverse or return phase the braking will be abrupt during the first part of the relative displacement of the rotor with respect to the stator, up to a maximum value from which it will attenuate progressively.

Thus good shock absorption is obtained and pendular oscillations of the damper system are avoided as much as possible.

Another object of the invention is to provide a damper construction in which a rotor moves with respect to a stator so as to produce friction forces, the angular rotary movement of said parts being limited.

The invention will be easily understood in the course of the following description referring to the annexed drawings in which:

Fig. 1 is a section, taken perpendicularly to the rotor shaft and following the line I—I in Fig. 2, of a damper according to the invention, in which the friction action of the rotor and stator is peripheral.

Fig. 2 is a radial section of this damper taken on the line II—II in Fig. 1.

Fig. 5 is an elevation of two somewhat angularly displaced assembled stators, adapted to receive a double rotor with peripheral friction action, the similar members of each rotor member being similarly angularly spaced.

Fig. 6 is an elevation of one of the peripheral action rotor members, the second complementary member being represented by dotted lines.

Fig. 7 is a vertical section of one of these members.

Fig. 8 is an elevation of a double rotor in one piece, formed with two identical members, the angular relative displacement of which is equivalent to that of the corresponding receiving recesses in the double stator Fig. 5.

Fig. 9 is a section of such a double rotor taken on the line IX—IX of Fig. 8.

Figure 3:
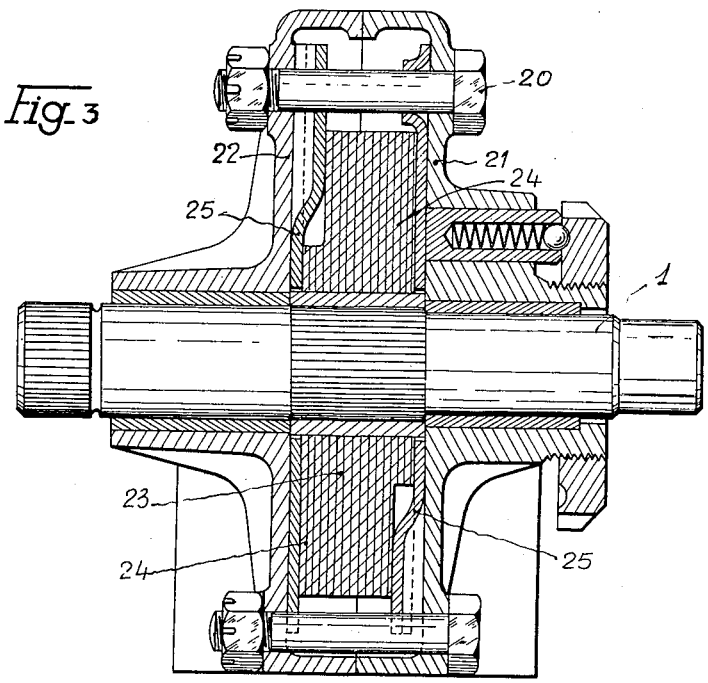
Fig. 3 is a view similar to that of Fig. 2, in which the friction action of the rotor and stator is lateral.

The Figures 1 and 2 illustrate a damper in which progressive action is obtained circumferentially. Fixedly mounted to a shaft 1 and coupled with the member the oscillations of which are to be damped, is the rubber rotor or rotor element 2 having on one of its lateral faces projections 4 and on its periphery bosses or projections 3, the axes of which are spaced 120° one from the other.

It will be seen that in Figures 1 and 2 the bosses 3 are the seat of the friction forces between the rotor 2 and the outer stator, whereas the projections 4 serve to limit the angular displacement of said rotor with respect to the stator.

The stator or stator element is composed of two end shields 5 and 6 joined together by a rim 7 and assembled by means of bolts 20. Said rim 7 is provided on its inner surface with recesses and protuberances symmetrically arranged according to three axes which are spaced 120° one from another. At rest, each boss 3 of the rotor 2 stays in a stator recess 8 which may be called brake recess, very wide-opened, the sides of which approach the center line of the apparatus by a slight slope until they attain the crest 9 corresponding with the rotor radius. After each crest 9 the inner shape of the stator moves rapidly away from the center line of the apparatus, so as to form a recess 10 of uniform depth which every boss of the rotor can engage without being compressed. This recess 10 may be called an escape recess.

When the damper is at rest each boss 3 of rotor 2 dwells in a recess 8. Regardless of the direction of rotation of rotor 2, the rotation of the rotor compels boss 3 to compress progressively since the volume assigned to it becomes progressively smaller and smaller; the friction force acting on one of the slopes moving from 8 to 9 thus increases until it reaches a maximum when the tip of boss 3 passes the crest 9, after which each boss 3 recovers rapidly its original shape within the recess 10. Since the shaft 1 is an oscillating one, it will then rotate in the opposite direction, so that boss 3 will be compressed rapidly due to the steep slope between recess 10 and crest 9, and will then slowly resume its normal shape until the neutral or balanced position of rotor 2 is obtained. Friction being directly proportional to the compression of the boss 3, regardless of the direction of oscillation of rotor 2, the damper brakes progressively during the forward stroke and abruptly during the return stroke.

The damper may, if desired, be equipped with means for limiting the angular motion of the rotor with respect to the stator.

For this purpose, the end shield 6 placed adjacent to projections or stop means 4 has on its inner face three complementary projections or stop means 11 having the shape of a sector of a circle, the center lines of which are spaced 120° one from another. It has been shown that the face of rotor 2, which faces these projections, has three projecting sectors 4, the center lines of which are also spaced 120° one from the other. These two series of sectors are of such size and arrangement that the projections of the rotor fit between those of the stator and allow sufficient angular displacement for the operation of the apparatus.

It will be noted that the rotor bosses 3 must be able to deflect at least 30° in one direction or the other, so that they may attain the crest 9 preceding the bottom of each adjacent recess 10. In order to allow a certain oscillation each boss must be allowed an angular deflection permitting it to attain substantially the middle of each adjacent recess 10. Consequently, and taking in account the respective position of the stator projections 11 and rotor projections 4, these will preferably be given an angular width substantially less than 30°. Taking for instance three projections 11 of 20° each and three projections 4 of 20° each, the maximum possible deflection of each boss 3 will be 80°, that is to say, 40° to the left and 40° to the right.

Other means shown in Fig. 2 permit initial adjustment of the coefficient of friction between rotor and stator. Instead of varying the initial friction on the peripheral portion of contact between rotor and stator, the initial friction on the lateral contact portion may be varied.

To this effect a nut 12 is screwed on a threaded hub 13 integral with end shield 5. Three fingers 14, one of which is shown in Fig. 2, traverse the end shield 5 and contact a disc 15 mounted between rotor 2 and end shield 5. When nut 12 presses the end of the fingers 14 projecting from the outside of end shield 5 it causes them to press the end shield 6 by means of disc 15, thus permitting adjustment of the initial friction.

Fingers 14 each have a blind hole 16 containing a spring and ball cooperating with a series of semi-peripheral holes 19, distributed over a circumference of suitable diameter, and thus form an arresting device assuring a constant adjustment.

In the modified construction shown in Fig. 3, the damper has two end shields 21 and 22 assembled by bolts 20. A rotor 23 is integral with shaft 1 and has a series of lateral projections 24 equally spaced on its two faces. Between each of these faces and the inner face of the end shields, there is arranged a plate 25 suitably undulated to form at least one brake cavity which cooperates with the rotor projections so as to bring about a braking action which is identical to that described for Fig. 1.

It will be noticed that in Fig. 3 the rubber rotor will be subjected not to radial deformation as in the case of Fig. 1, but lateral deformation with respect to shaft 1, the effect of which is to produce variations of the thickness of this rotor, which variations will bring about the same result as the diametral variations of the rotor Fig. 1.

Figure 4:
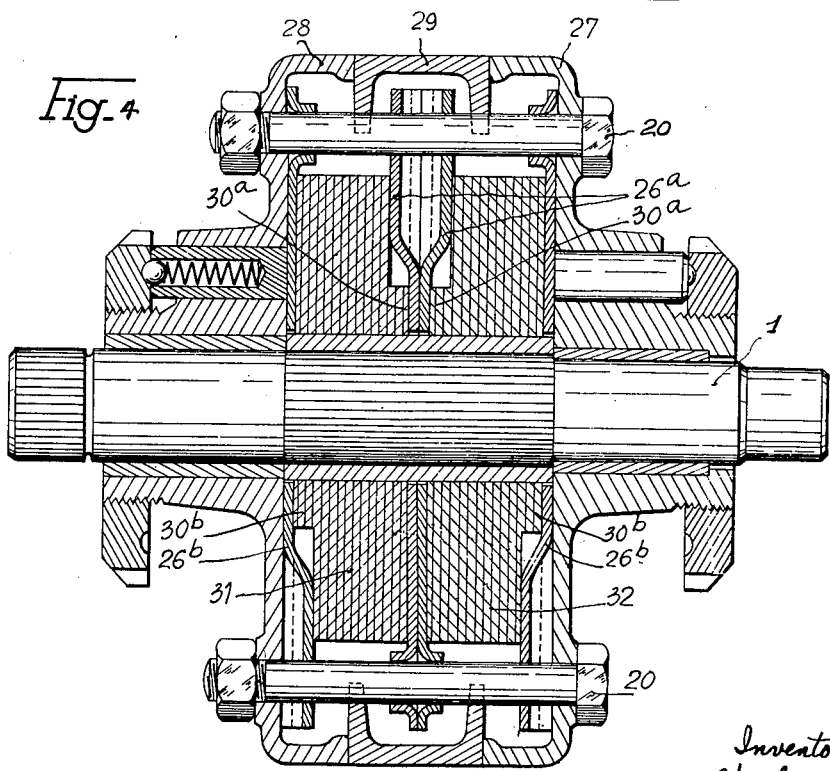
Fig. 4 is a view similar to that of Fig. 2, showing a modified construction of Fig. 3, in which the damper has a double rotor with lateral friction action.

The damper shown in Fig. 4 is a double device in which a set of plates 26a and 26b maintained by bolts 20 connecting the end shields 27 and 28 to rim 29, compels projections 30a and 30b of the two rotors 31 and 32 to deform in the manner described in connection with the projections 24 in Fig. 3.

In the embodiment shown in Fig. 5 are two coaxially assembled rims 7a and 7b, the inner shape of which is similar to that of the stator shown in Fig. 1. These rims are maintained in laterally clamped state by end shields identical to end shields 5 and 6, and might even form only one piece. Such a stator has two series of recesses 8a and 8b, spaced 120° in each series, two series of crests 9a and 9b spaced 120° in each series, and two series of recesses 10a and 10b spaced 120° in each series.

The recesses 8a and 8b are spaced 60° from each other in two distinct series, crests 9a and 9b coincide in two distinct series, and recesses 10a and 10b are spaced 60° from each other in two distinct series. Consequently, a sectional view of Fig. 5 taken on a radial plane passing through each bottom of the recesses 8a and 8b, would show adjacent to each recess 8a a recess 10b, and beside each recess 8b a recess 10a. In other terms, the radial symmetry plane of each recess 8 coincides with the radial symmetry plane of each recess 10.

It will be easily understood that in this double stator a double rotor 2a, 2b must be inserted, each member of which is identical with rotor 2 shown in Figs. 1 and 2. The bosses 3a of rotor 2a will thus be spaced 60° with respect to bosses 3b of rotor 2b. Figures 6 and 7 show such a rotor made of two parts keyed on the same shaft.

For each set of cooperating stator and rotor the friction is proportional to the deformations of the projections and since the recesses and protuberances of the stator are arranged symmetrically with respect to the neutral or rest point, the braking action will be slowly progressive, regardless of direction of rotation of the rotor, until maximum friction is reached in the course of the first portion of the rotation. After having attained this maximum value the friction will rapidly fall to zero, and it will be understood, therefore, that during the reverse or return rotation the braking action will be abrupt in the first portion until a maximum intensity is reached, from which the braking action will diminish progressively.

Due to the multiplicity of the rotor-stator ensembles, the damper is more effective and can more easily be adapted to the function for which it has been designed. Thus for the suspension of a light vehicle a rotor with two series of bosses or projections in the direction of the thickness is generally sufficient. For a heavy vehicle, it is sufficient to add a certain number of said series of bosses or projections.

In the embodiment such as has just been described, the rotors are keyed on the operating shaft so that the bosses or projections of two distinct series are spaced at the same angle as that of the adjacent neutral points of the distinct stator profiles. But it will be understood that this spacing may be slightly different from that of the precise neutral points, so as to produce initially a certain peripheral friction resulting in a "stiffening" of the damper.

The object of this initial tension is to avoid the substantial lost motion due to the beginning of the compression period during which the friction is not sufficient to have any substantial effect.

As in the embodiments illustrated in Figs. 1 and 2, the damper composed of the members shown in Figs. 5, 6 and 7 may be provided with means to adjust the initial lateral friction of the rotors against the connecting shields of the rims 7a and 7b, these means consisting of nuts similar to nut 12.

Likewise, there may be provided stop means to angularly limit the rotation of the rotor with respect to the stator. This may be accomplished by means of one or several projections such as are shown at 4a provided laterally on one or the other of the rotors 2a or 2b or simultaneously on the two, said projection 4a cooperating with a cavity or stop provided in the adjacent end shield of the stator.

Fig. 8 represents an integral double rotor 2c similar to the assembly of the rotors 2a and 2b. This rotor 2c shows peripherally and laterally the same conformation as the assembly 2a, 2b and it may be an integral cast member. This results consequently in the same respective angular arrangement of the bosses or projections 3a, 3b and 4c.

In conformity with the preceding explanations, it is obviously possible to multiply at will the number of laterally assembled rotors, provided the same number of identical internal receiving profiles are arranged in the stator.

It is understood that without departing from the scope of the invention, variations of the heretofore described embodiments may be conceived. In particular the rotor material may be chosen from natural or synthetic resilient resins.

Likewise it is possible to combine the action of friction between rotor and stator by means of peripheral or lateral bosses or projections, that is to say that the braking actions described in connection with Figures 1 and 2 on one hand and in connection with Fig. 3 on the other hand, may be combined in one device.

What we claim is:

1. Oscillation damping apparatus, comprising, in combination, a shaft adapted to be oscillated about its axis by a structure whose oscillations are to be damped; a rotor fixedly connected to said shaft to oscillate therewith and having a plurality of curved projections of yieldable, resilient material provided with a crest, gradually sloping sides extending symmetrically therefrom and merging into said rotor, equally spaced about the periphery thereof; a stator located next to said rotor and being formed with a plurality of braking recesses equally spaced about the periphery thereof and having said projections of said rotor located therein, said recesses of said stator having gradually sloping sides located opposite and being of substantially the same inclination as said sides of said projections of said rotor, said stator also being formed with a plurality of escape recesses equal in number to the number of braking recesses, said escape recesses being located intermediate said braking recesses and forming together therewith an undulating outline along the periphery of the stator, said escape recesses being adapted to receive at least a part of said projections upon rotation of said rotor with respect to said stator.

2. Oscillation damping apparatus, comprising, in combination, a shaft adapted to be oscillated about its axis by a structure whose oscillations are to be damped; a rotor fixedly connected to said shaft to oscillate therewith and having a plurality of curved projections of yieldable, resilient material provided with a crest, gradually sloping sides extending symmetrically therefrom and merging into said rotor, equally spaced about the periphery thereof; a stator located next to said rotor and being formed with a plurality of braking recesses equally spaced about the periphery thereof and having said projections of said rotor located therein, said recesses of said stator having gradually sloping sides located opposite and being of substantially the same inclination as said sides of said projections of said rotor, said stator also being formed with a plurality of escape recesses equal in number to the number of braking recesses, said escape recesses being larger than said braking recesses and forming together therewith an undulating outline along the periphery of the stator, said escape recesses being adapted to receive at least a part of said projections upon rotation of said rotor with respect to said stator.

3. Oscillation damping apparatus, comprising, in combination, a shaft adapted to be oscillated about its axis by a structure whose oscillations are to be damped; a rotor fixedly connected to said shaft to oscillate therewith and having a plurality of curved projections of yieldable, resilient material provided with a crest, gradually sloping sides extending symmetrically therefrom and merging into said rotor, equally spaced about the periphery thereof; a stator located next to said rotor and being formed with a plurality of braking recesses equally spaced about the periphery thereof and having said projections of said rotor located therein, said recesses of said stator having gradually sloping sides located opposite and being of substantially the same inclination as said sides of said projections of said rotor, said stator also being formed with a plurality of escape recesses equal in number to the number of braking recesses, said escape recesses being larger than said braking recesses and having compression crests separating the braking recesses and the escape recesses and forming together therewith an undulating outline along the periphery of the stator, said escape recesses being adapted to receive at least a part of said projections upon rotation of said rotor with respect to said stator.

4. Oscillation damping apparatus, comprising, in combination, a shaft adapted to be oscillated about its axis by a structure whose oscillations are to be damped; a rotor fixedly connected to said shaft to oscillate therewith and having a plurality of curved projections of yieldable, resilient material provided with a crest, gradually sloping sides extending symmetrically therefrom and merging into said rotor, equally spaced about the periphery thereof; a stator including at least one rim member disposed transverse to the axis of the shaft, encompassing said rotor and being formed with a plurality of braking recesses equally spaced about the inner periphery thereof and having said projections of said rotor located therein, said recesses of said rim member having gradually sloping sides located opposite and being of substantially the same inclination as said sides of said projections of said rotor, said rim member also being formed with a plurality of escape recesses equal in number to the number of braking recesses, said escape recesses being located intermediate said braking recesses and forming together therewith an undulating outline along the inner periphery of aid rim member, said escape recesses being adapted to receive at least a part of said projections upon rotation of said rotor with respect to said rim member.

5. Oscillation damping apparatus, comprising, in combination, a shaft adapted to be oscillated about its axis by a structure whose oscillations are to be damped; a rotor fixedly connected to said shaft to oscillate therewith and having a plurality of curved projections of yieldable, resilient material provided with a crest, gradually sloping sides extending symmetrically therefrom and merging into said rotor, equally spaced about the periphery thereof; a stator located next to said rotor and being formed with a plurality of braking recesses equally spaced about the periphery thereof and having said projections of said rotor located therein, said recesses of said stator having gradually sloping sides located opposite and being of substantially the same inclination as said sides of said projections of said rotor, said stator also being formed with a plurality of escape recesses equal in number to the number of braking recesses, said escape recesses being larger than said braking recesses and having compression crests separating the braking recesses and the escape recesses, the slope of the sides of the escape recesses being steeper than the slope of the sides of said braking recesses, said escape recesses being adapted to receive at least a part of said projections upon rotation of said rotor with respect to said stator.

6. Oscillation damping apparatus, comprising, in combination, a shaft adapted to be oscillated about its axis by a structure whose oscillations are to be damped; a rotor fixedly connected to said shaft to oscillate therewith and having a curved projecting portion provided with gradually sloping sides merging into said rotor; a stator located next to said rotor and being formed with a recessed portion in which said projecting portion of said rotor is located, said recessed portion of said stator having gradually sloping sides located opposite and being of substantially the same inclination as said sides of said projecting portion of said rotor, so that said projecting portion of said rotor will, upon turning of said shaft, move with respect to said stator and bear with increased friction against said recessed portion of said stator, one of said portions being made of a yieldable resilient material and the other of said portions being made of a substantially rigid material so that said one portion will become compressed and change its position with respect to said other portion during turning movement of said rotor with respect to said stator; and means adjusting the tightness of engagement of said projecting portion with said recessed portion including a plate disposed on a side of said portion of yieldable resilient material, a hub coaxially mounted on said shaft and supporting said plate in a plane transverse to the axis of said shaft, said plate being formed with apertures, a plurality of fingers having one end passing through said apertures, a compression plate located between the portions of yieldable resilient material and said plate and bearing against said one end of said fingers on one side and against said yielding material on the other side, and adjustable means mounted on said hub for movement in an axial direction bearing against the other side of said fingers to tighten said fingers against said compression plate and against said yieldable material.

References Cited in the file of this patent

UNITED STATES PATENTS

| | | | |
|---|---|---|---|
| 1,649,426 | Van Ranst | Nov. 15, | 1927 |
| 1,810,872 | Lord | June 16, | 1931 |
| 1,835,013 | Chryst | Dec. 8, | 1931 |
| 2,125,270 | Conover | Aug. 2, | 1938 |
| 2,159,235 | Tyler et al. | May 23, | 1939 |
| 2,160,611 | Alexander | May 30, | 1939 |
| 2,449,654 | Jessop | Sept. 21, | 1948 |
| 2,473,335 | Hardy | June 14, | 1949 |
| 2,556,624 | Macbeth et al. | June 12, | 1951 |

FOREIGN PATENTS

| | | |
|---|---|---|
| 19,595 | Great Britain | 1910 |
| 693,122 | France | Aug. 18, 1930 |